(12) United States Patent
Wu

(10) Patent No.: US 9,917,520 B2
(45) Date of Patent: Mar. 13, 2018

(54) POWER SUPPLY INCLUDING A FLYBACK CONTROLLER AND BUCK CONVERTER

(71) Applicant: GOOGLE INC., Mountain View, CA (US)

(72) Inventor: Xuelin Wu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/178,073

(22) Filed: Jun. 9, 2016

(65) Prior Publication Data

US 2016/0365797 A1  Dec. 15, 2016

Related U.S. Application Data

(60) Provisional application No. 62/173,178, filed on Jun. 9, 2015.

(51) Int. Cl.
*H02M 3/335* (2006.01)
*H02J 1/10* (2006.01)

(52) U.S. Cl.
CPC ............................... *H02M 3/33523* (2013.01)

(58) Field of Classification Search
CPC ...................... H02M 3/33507; H02M 3/33523
USPC ....................... 363/21.12–21.18, 65
See application file for complete search history.

(56) References Cited

U.S. PATENT DOCUMENTS

| 7,061,212 B2 | 6/2006 | Phadke | |
| 7,529,105 B1 * | 5/2009 | Choi | H02M 3/33523 363/131 |
| 7,768,801 B2 * | 8/2010 | Usui | H02M 3/33561 363/17 |
| 8,289,731 B2 | 10/2012 | Spiridon et al. | |
| 2004/0145922 A1 | 7/2004 | Jutras et al. | |
| 2007/0018622 A1 | 1/2007 | Chen | |

(Continued)

FOREIGN PATENT DOCUMENTS

EP    2515426 A1    10/2012

OTHER PUBLICATIONS

"Secondary Side Post Regulator (SSPR) for Switching Power Supplies with Multiple Outputs", Semiconductor Components Industries, LLC, Publication Order No. CS5101AN/D, Rev.1, Apr. 2001, 16 pages.
Alonso, et al., "Integrated Buck-Flyback Converter as a High-Power-Factor Off-Line Power Supply", IEEE Transactions on Industrial Electronics, vol. 55, No. 3, Mar. 2008, pp. 1090-1100.
George, et al., "Simulation of HPF Offline Power Supply for Wide Input Voltage Ranges Using IBFC", National Journal on Electronic Sciences & Systems, vol. 3, No. 2, Oct. 2012, pp. 39-48.

(Continued)

*Primary Examiner* — Gary Nash
(74) *Attorney, Agent, or Firm* — Brake Hughes Bellermann LLP

(57) ABSTRACT

Power adapters generally include a few components that make up the majority of the volume. One component that can consume a relatively large volume is a bulk capacitor. In accordance with the implementations described herein, the size (which can include the capacitance value or volume) of the bulk capacitor within a power adapter can be reduced. Moreover, by introducing a new control scheme, the bulk capacitor can be eliminated from the power adapter. This size reduction or elimination of the bulk capacitor from a power adapter can result in not only a smaller power adapter, but can also result in a lower cost for production of the power adapter and/or an improvement in the power factor and/or power efficiency of the power adapter. This type of relatively small adapter can be beneficial from a user experience perspective.

20 Claims, 5 Drawing Sheets

(56) References Cited

U.S. PATENT DOCUMENTS

| | | |
|---|---|---|
| 2007/0041226 A1 | 2/2007 | Powers |
| 2008/0130325 A1 | 6/2008 | Ye |
| 2008/0304293 A1 | 12/2008 | Spiridon et al. |
| 2010/0141177 A1 | 6/2010 | Negrete et al. |
| 2011/0032731 A1* | 2/2011 | Coleman ............ H02M 1/4258 363/21.12 |
| 2012/0218670 A1* | 8/2012 | Han ........................ H02H 7/20 361/18 |
| 2013/0329463 A1* | 12/2013 | Chen ................. H02M 1/4258 363/17 |
| 2013/0343100 A1 | 12/2013 | Dijkman |
| 2014/0051292 A1* | 2/2014 | Weaver, Jr. ........ H01R 13/6675 439/620.21 |
| 2014/0154994 A1* | 6/2014 | Mason ............. H04N 21/43635 455/66.1 |
| 2015/0103566 A1 | 4/2015 | Keogh et al. |

OTHER PUBLICATIONS

Kumar, et al., "Synchronous Flyback Converter With Synchronous Buck Post Regulator", IJRET, vol. 3, Issue 4, Apr. 2014, pp. 967-975.

Lazaro, et al. "New Power Factor Correction AC-DC Converter With Reduced Storage Capacitor Voltage", IEEE Translation on Industrial Electronics, vol. 54, No. 1, Feb. 2007, pp. 384-397.

Naresh, et al., "Multi Output Fly back Converter with Switching/Linear Post Regulators", IJRDET, vol., 2, Issue 6, Jun. 2014, pp. 21-26.

Rezaei, "A Control Scheme for an AC-DC Single-Stage Buck-Boost PFC Converter", Western University Electronic Thesis and Dissertation Repository, Aug. 2012, 92 pages.

International Search Report and Written Opinion received for PCT Patent Application No. PCT/US2016/036695, dated Sep. 22, 2016, 8 pages.

* cited by examiner

POWER SUPPLY INCLUDING A FLYBACK CONTROLLER AND BUCK CONVERTER

CROSS REFERENCE TO RELATED APPLICATION

This application is a Non-Provisional of, and claims priority to, U.S. Patent Application No. 62/173,178, filed on Jun. 9, 2015, entitled "A POWER SUPPLY INCLUDING A FLYBACK CONTROLLER AND BUCK CONVERTER", which is incorporated by reference herein in its entirety.

TECHNICAL FIELD

This description relates to a flyback power supply or adapter including a buck converter.

BACKGROUND

A computing device can be portable and can operate on power provided by a rechargeable battery. A computing device additionally, or in the alternative, can operate on power provided by a power converter (sometimes referred to as a power brick). The power converter converts power received by plugging one part of the power converter into an alternating current (AC) receptacle ("the wall") into direct current (DC) power at a voltage that is used by the computing device and provided to the computing device using another connector or adapter that can plug into a receptacle provided on the computing device. In some cases, the DC power can also charge/recharge the battery while providing power to the computing device. The power adapter can convert (adapt) the voltage (110/220 Volts) of the power received from the alternating current (AC) receptacle ("the wall") to the voltage required by the computing device.

SUMMARY

A traditional Flyback converter uses a large bulk capacitor after the bridge rectifier to maintain the rectified voltage. The output of such a Flyback converter is a DC voltage. This configuration has low power density because the bulk cap takes too much space. In an improved technique, the bulk capacitor is to be minimized and the output of the Flyback converter is not a DC voltage any more, instead, it is s a DC voltage with large ripple overlapping it. An additional buck converter is used to generate a DC voltage from the large ripple.

In one general aspect, a circuit can include a transformer electrically coupled between a primary side of the circuit and a secondary side of the circuit. The primary side of the circuit includes an input terminal configured to receive an input alternating current (AC) voltage signal, a bridge rectifier configured to (i) receive the input AC voltage signal from the input terminal and (ii) output a rectified AC voltage signal from the input AC voltage signal, and a flyback controller configured to produce, across the transformer, a time-varying fly voltage signal on the second side of the circuit from the rectified AC voltage signal on the first side of the circuit. The secondary side of the circuit includes a buck converter configured to generate a direct current (DC) output voltage based on the time-varying fly voltage signal.

Implementations can include one or more of the following features. For example, the primary side of the circuit can include a power switch having a state, the state being one of an ON state and an OFF state. The ON and OFF state is controlled by a PWM signal from the Flyback controller. The flyback controller configured to produce the time-varying fly voltage signal on the second side of the circuit can be further configured to toggle the switch between the ON state and the OFF state. The switch can be configured to, in the ON state, store energy in the transformer from current flowing through a primary winding of the transformer in the primary side of the circuit, the current flowing through the primary winding being generated by the rectified AC voltage signal; and in the OFF state, transfer the energy in the transformer to a secondary winding of the transformer in the secondary side of the circuit to produce the time-varying fly voltage signal.

The circuit can further include a feedback circuit configured to produce a feedback signal based on the time-varying fly voltage signal. The flyback controller configured to toggle the switch between the ON state and the OFF state can be further configured to receive the feedback signal produced by the feedback circuit; and set the switch to be in one of the ON state and the OFF state according to the feedback signal.

The flyback controller configured to produce the time-varying fly voltage signal on the second side of the circuit can be further configured to generate, as the time-varying fly voltage signal, a voltage signal including a maximum voltage; and a minimum voltage less than the maximum voltage and greater than the DC output voltage. The voltage signal can further include a frequency about equal to a frequency of the rectified AC voltage signal.

The secondary side of the circuit can further include a fly capacitor configured to produce a regulated voltage signal from the fly voltage signal, the regulated voltage signal having a smaller peak-to-peak variation over time than the fly voltage signal. The buck converter configured to generate the DC output voltage based on the time-varying fly voltage signal can be further configured to receive the regulated voltage signal from the fly capacitor; and produce the DC output voltage from the regulated voltage signal.

The primary side of the circuit can further include a bulk capacitor between the bridge rectifier and the transformer, the bulk capacitor having a small capacitance. The fly capacitor is larger than a traditional flyback converter because of the small bulk cap. However, the voltage rating of the fly capacitor is much smaller than the bulk cap, so the total size of the power adapter is smaller.

The DC output voltage provides a load for a universal serial bus (USB) type C adapter.

The buck converter is desired to be high efficiency to maintain the overall efficiency of the power adapter.

In another aspect, a method can include receiving an alternating current (AC) voltage signal at an input terminal of a first side of a circuit; rectifying the AC voltage signal to produce a rectified AC voltage signal at the first side of the circuit; producing a time-varying fly voltage signal on a second side of the circuit from the rectified AC voltage signal on the first side of the circuit, the first side of the circuit being electrically connected to the second side of the circuit by a transformer; and generate a direct current (DC) output voltage at an output terminal of the second side of the circuit based on the time-varying fly voltage signal.

The details of one or more implementations are set forth in the accompanying drawings and the description below. Other features will be apparent from the description and drawings, and from the claims.

DETAILED DESCRIPTION

As mobiles devices become thinner and/or lighter, the size (e.g., volume) of the power adapter (or charger) becomes comparatively large. Having a large power adapter may be inconvenient especially when compared with the thinner and/or lighter devices which are powered by these power adapters.

Power adapters generally include a few components that make up the majority of the volume. One component that can consume a relatively large volume is a bulk capacitor. The bulk capacitor can occupy 20% or more of the volume of a power adapter using a flyback topology (e.g., offline flyback topology), which can be a useful topology for applications below 75 W.

In accordance with the implementations described herein, the size (which can include the capacitance value or volume) of the bulk capacitor within a power adapter can be reduced. In some power adapter implementations described herein, the bulk capacitor can be entirely eliminated. By introducing a new control scheme, the bulk capacitor can be eliminated, in some implementations, from the power adapter. This size reduction or elimination of the bulk capacitor from a power adapter can result in not only a smaller power adapter, but can also result in a lower cost for production of the power adapter and/or an improvement in the power factor and/or power efficiency of the power adapter. This type of relatively small adapter can be beneficial from a user experience perspective.

Figure 1:
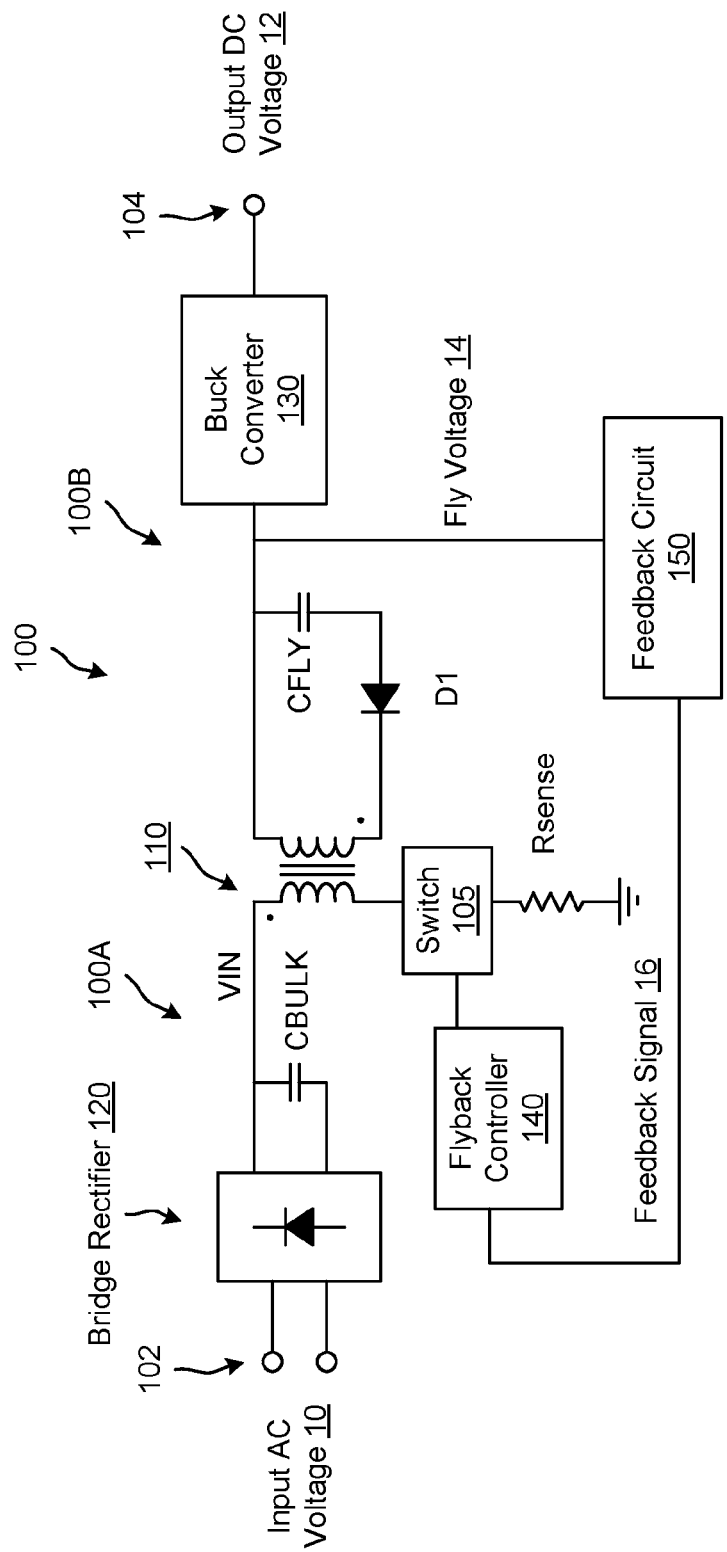
FIG. 1 is a diagram that illustrates a power converter circuit according to an implementation.

FIG. 1 is a diagram that illustrates a power converter circuit 100 (also can be referred to as a circuit) according to an implementation. As shown, in FIG. 1, the circuit 100 includes a flyback controller 140 (e.g., an offline flyback controller) on a primary side 100A of the circuit 100 in series with a buck converter 130 on a secondary side 100B of the circuit 100. The primary side 100A of the circuit 100 is associated with the input alternating current (AC) voltage signal 10 at an input 102 on a first side of a transformer 110 and the secondary side 100B of the circuit 100 is associated with the output direct current (DC) voltage 12 at an output 104 on a second side of the transformer 110.

The circuit 100 can be configured to produce a stable, isolated output DC voltage 12 based on the input AC voltage signal 10. The basic operation of the circuit is as follows. The input AC voltage 10 signal is rectified to a relatively high DC voltage using a bridge rectifier 120 to produce a rectified AC voltage. The rectified AC voltage is used to charge the capacitor CBULK (which can be referred to as an input capacitor). The flyback controller 140 controls a switch 105 (e.g., a metal-oxide semiconductor field-effect-transistor (MOSFET) or another type of switch), which is configured to magnetically trigger energizing of the transformer 110 via a current through a primary winding of the transformer 110 when the switch 105 is in an ON state (or closed). When the switch 105 is in an OFF state (or open), energy from the transformer 110 is transferred to a secondary winding of the transformer 110, to charge the capacitor CFLY (also can be referred to as an output capacitor). The transformer 110 can also be configured to provide isolation between the primary side 110A of the circuit 100 and the secondary side 110B of the circuit 100.

The output voltage on the secondary side 110B of the circuit, which is shown as a time-varying fly voltage signal 14 (on a fly voltage line or wire, which is the voltage of the capacitor CFLY), can be used to produce a feedback signal 16 (on a feedback line or wire) using a feedback circuit 150. Although now shown in this implementation, the feedback circuit 150 can include, for example, one or more optical couplers (also referred to as optocouplers), error amplifiers, compensation circuits, reference voltages/circuits, resistor networks, and/or so forth. The feedback signal 16 can be used by the flyback controller 140, to control the switch 105 (e.g., an ON time period of the switch 105) to maintain a stable secondary output voltage, which is the fly voltage 14.

As mentioned above, the flyback controller 140 is used in conjunction with the buck converter 130 to produce the output voltage 12. This is contrasted with a circuit configuration that does not include a buck converter or a circuit configuration that can include a relatively high power consumption device to produce an output voltage. The configuration of the circuit 100 can allow for the time-varying fly voltage signal 14 to be a variable voltage rather than a fixed voltage such as 5 V or 12 V. The buck converter 130 can be used to produce a stable, fixed voltage as the output voltage 12. In some implementations, the time-varying fly voltage signal 14 can vary between +/−5% to +/−30%, depending on the capacitance (e.g., capacitance value) of the capacitor CFLY. In some implementations, the time-varying fly voltage signal 14 can vary more than +/−30% or less than +/−5%.

Because the time-varying fly voltage signal 14 can be variable instead of fixed, the bulk capacitor CBULK can be configured as a relatively small capacitor (e.g., 1 microfarad ($\mu F$)) or can be entirely removed from the circuit 100. In some implementations, the size of the bulk capacitor CBULK can be 10 times, or a 100 times smaller than in a circuit that does not include the buck converter 130. The reduction in size of the bulk capacitor CBULK or removal of the bulk capacitor CBULK can significantly reduce the size (e.g., volume) and cost of the circuit 100. In some implementations, the capacitor CFLY can have a capacitance of approximately 20% to 30% of the capacitance of the capacitor CBULK. In some implementations, the capacitance CFLY can be less than 20% of the capacitance of the capacitor CBULK or the capacitance CFLY can be greater than 30% of the capacitance of the capacitor CBULK.

In some implementations, the circuit 100 can included in a variety of applications including relatively small charger adapters that operate at approximately 75 Watts (W) or greater. For example, in some implementations, the circuit 100 can be used in a universal serial bus (USB) type-C adapter.

In at least one implementation, the circuit 100 can be configured so that the minimum of the time-varying fly voltage signal 14 is greater than the output DC voltage 12. The time-varying fly voltage signal 14 can be configured to be maintained within (e.g., swing within) a voltage range that is higher than the output DC voltage 12 produced by the buck converter at the output 104. For example, the time-varying fly voltage signal 14 can be configured to be maintained within a voltage of range of between 5 V to 10 V, which can have a minimum value that is at least 1 V to 5 V higher than the output DC voltage 12.

As a specific example, the circuit 100 can be configured so that the fly voltage 14 can be at a relatively high level such as 28V. Because the bulk capacitor CBULK can be removed or kept at a relatively low value, a transformer input voltage VIN into the transformer 110 can follow the rectified AC voltage, which is the absolute value of a sinusoidal waveform. When the transformer input voltage VIN is high, the flyback controller 140 can be configured to transfer energy from the primary side 100A to the secondary side 100B and charge up the capacitor CFLY to 28V. When transformer input voltage VIN is dropping, less energy will be transferred to the secondary side 100B, so the time-varying fly voltage signal 14 can start to drop to provide energy to a load (not shown). The size of the capacitor CFLY can be calculated such that when the time-varying fly voltage signal 14 drops to a lower voltage level such as 22V, the transformer input voltage VIN can rise high enough to start charging the capacitor CFLY. This mechanism can result in a swinging output of the time-varying fly voltage signal 14 from 22V to 28V. Since the output DC voltage 12 produced by the buck converter 130 can be lower than the time-varying fly voltage signal 14, the buck converter 130 can produce the output DC voltage 12 in a stable fashion. For example, the buck converter 130 can be configured to produce voltages of approximately 5V, 12V or 20V (at maximum), so the output DC voltage 12 is not impacted in an undesirable fashion.

In accordance with the disclosure herein, the bulk capacitor CBULK (which would have to be quite large and could occupy approximately 20% or more of a volume of an adapter without the teachings disclosed herein) can be eliminated or reduced significantly in size, making a tiny adapter feasible. Also, without the teachings described herein, in USB type-C application, a maximum voltage of 20 V could only be obtained if the time-varying fly voltage signal 14 were maintained at 20 V.

Figure 2A:
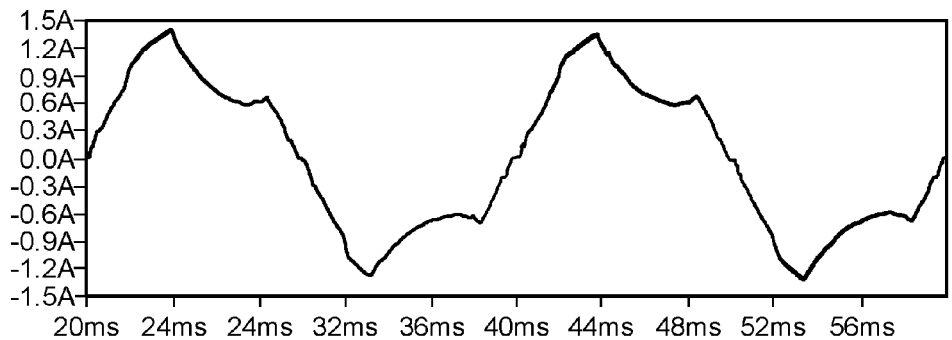
FIGS. 2A through 2C are diagrams that illustrates waveforms associated with the circuit shown in FIG. 1.
Figure 2B:
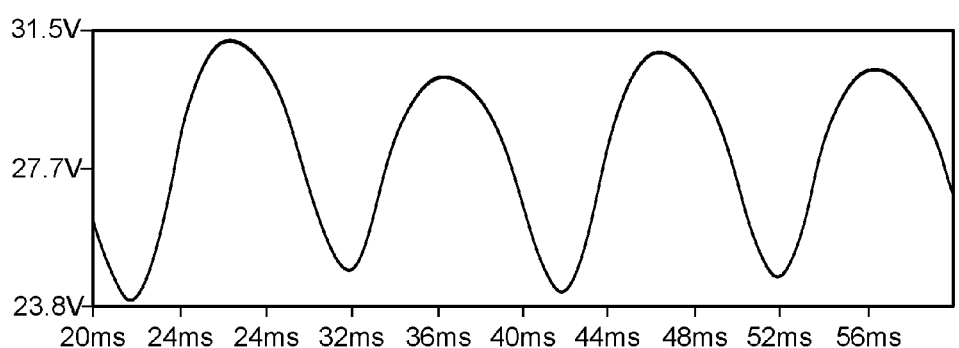
Figure 2C:
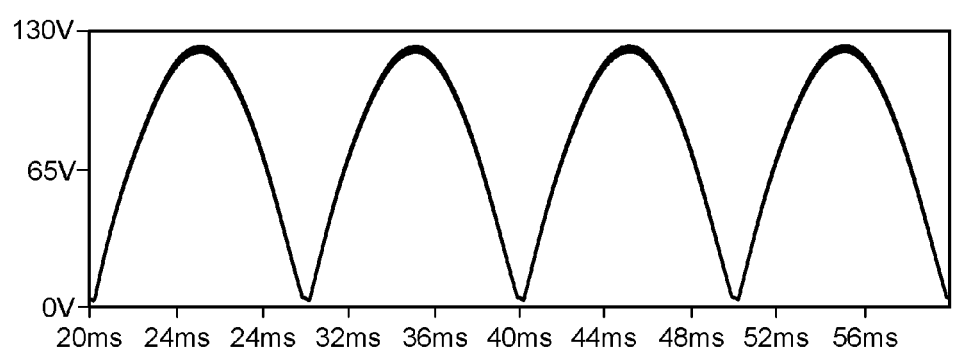

FIGS. 2A through 2C are diagrams that illustrate waveforms associated with the circuit 100 shown in FIG. 1. FIG. 2A illustrates an input AC current at the input AC voltage 10 at input 102 shown in FIG. 1. As shown in FIG. 2A, the input current is not pulsing as in a typical flyback configuration. The input AC current approximately follows the shape of the input AC voltage 10 (not shown). This behavior can result in a desirable power factor (which is a combination of the input AC voltage 10 and the input AC current.

FIG. 2B illustrates the time-varying fly voltage signal 14, which is moving between a voltage range of a low voltage and a high voltage of approximately 23.8 V and 31.5 V. As shown in FIG. 2B, the time-varying fly voltage signal 14 is operating as desired, swinging between a low voltage and a high voltage, being charged and discharging energy to a load (not shown).

FIG. 2B illustrates the transformer input voltage VIN. The voltage VIN can follow the input AC voltage 10.

Figure 3:
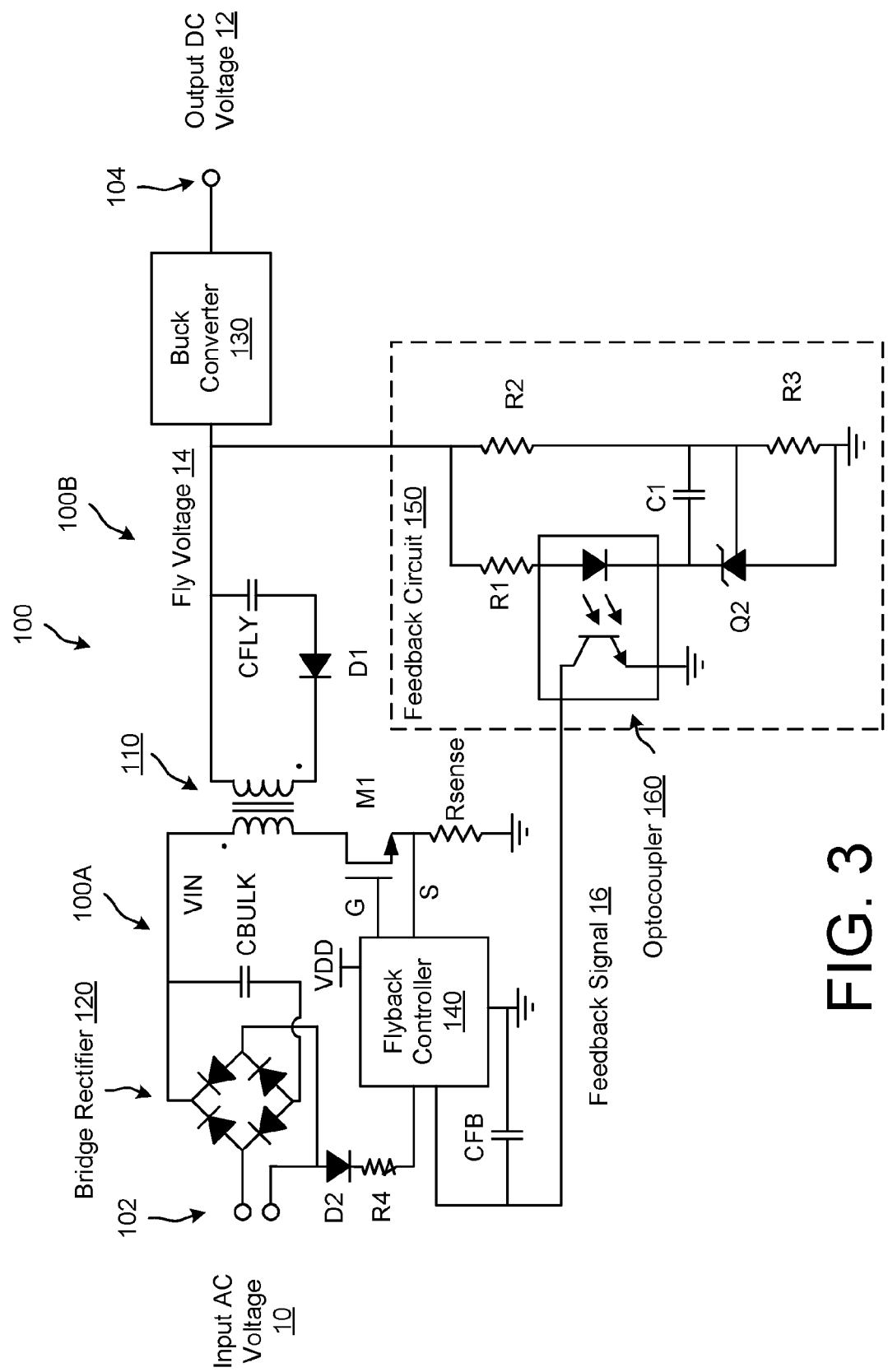
FIG. 3 is a diagram that illustrates another power converter circuit based on the circuit shown in FIG. 1 according to an implementation.

FIG. 3 is a diagram that illustrates another power converter circuit based on the circuit 100 shown in FIG. 1 according to an implementation. FIG. 3 illustrates more specific implementations of the elements of the circuit 100 shown in FIG. 1.

FIG. 3 illustrates an implementation of the bridge rectifier 120 that includes at least four diodes. Although many specific elements are illustrated in FIG. 3. In some implementations, some of the elements or components can be modified or replaced with other components.

FIG. 3 also illustrates an implementation of the feedback circuit 150 that includes an optocoupler, resistors R1 through R3, capacitor C1, and zener diode Q2. In some implementations, the circuit 100 can include a variety of error amplifiers, compensation circuits, reference voltages/circuits, resistor networks, and/or so forth. The feedback signal 16, in this implementation, includes a feedback capacitor CFB. The flyback controller 140 also includes a connection to a voltage rail VDD and the input AC voltage 10 via diode D2 and resistor R4.

The switch 105, in FIG. 3, is implemented as a MOSFET device M1. In this case, the MOSFET device M1 is an n-type MOSFET device with a gate connection G and a source connection S. In some implementations, the diode D1 can be a zener diode or a synchronous rectifier (which can be a controlled MOSFET or a Gallium Nitride (GaN) FET. In some implementations, the MOSFET device can be a GaN FET.

In some implementations, the circuits described herein can be associated with a control method that can operate a flyback converter without the bulk capacitor. In some implementations, the circuits described herein can be associated with a control method that can improve the power factor of the AC/DC converter by removing or reducing the bulk capacitor.

Figure 4:
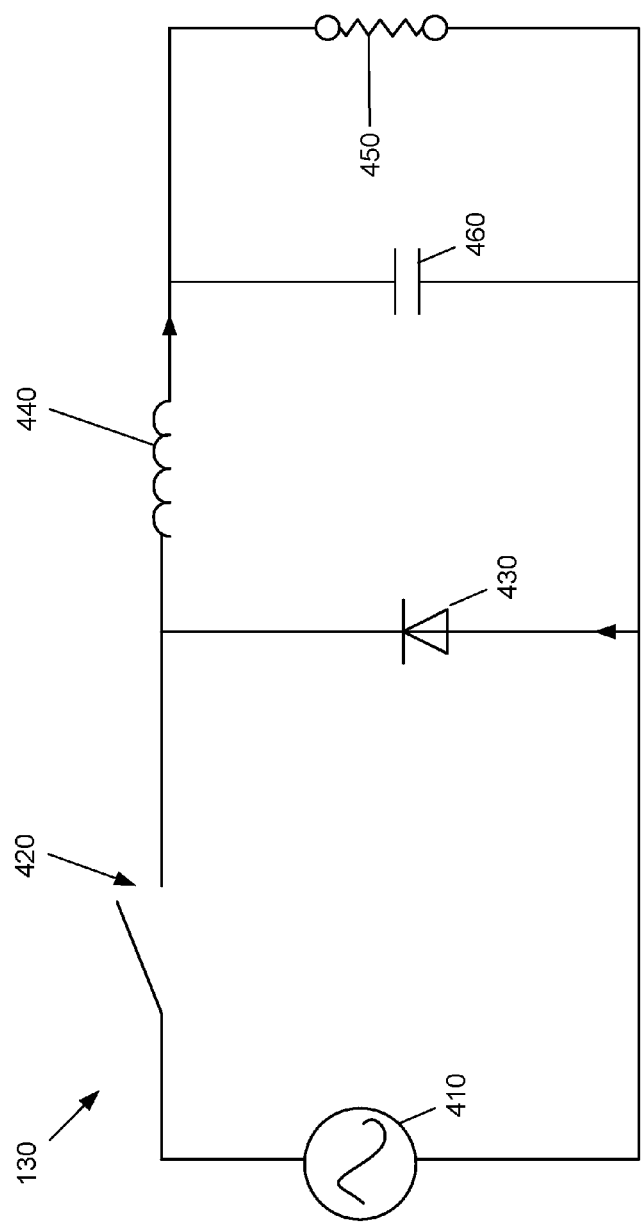
FIG. 4 is a diagram that illustrates additional detail concerning the buck converter shown in FIG. 1 and FIG. 3.

FIG. 4 is a diagram that illustrates example detail related to the buck converter 130 shown in FIG. 1 and FIG. 3. As depicted in FIG. 4, the buck converter 130 includes a input voltage source 410 (corresponding to time-varying fly voltage signal 14 in FIG. 1 and FIG. 3), a switch 420, a diode 430, an inductor 440, a DC voltage output across a load 450, and a capacitor 460 in series with the inductor 440.

The switch 420 is implemented as a power MOSFET device. In some implementations, the power MOSFET device can be a GaN FET. The switch 420 is configured to toggle on and off with regularity according to a specified duty cycle. In some arrangements, the duty cycle is specified by a ratio of the output DC voltage across the load 450 to a voltage of the input fly voltage signal 410 (e.g., the minimum voltage). For example, if the output voltage is 8 V and the minimum voltage of the time-varying fly voltage signal 14 is 22 V, then the duty cycle is 8/22.

The inductor 440 is configured to provide a voltage drop when the switch 420 is closed (ON-state) to counteract the voltage of the source 410 and therefore reduce a net voltage across the load 450. When the switch is opened again (OFF-state), the voltage source 410 will be removed from the circuit 130, and the current will decrease. The changing current will produce a change in voltage across the inductor 440, and the inductor 440 becomes a voltage source. The stored energy in a magnetic field of the inductor 440 supports current flow through the load 450. Note that the voltage through the load 450 is always less than any voltage provided at the source 410 because there is always a voltage drop across the inductor 440.

Ideally, the buck converter 130 provides 100% of the power received at the input to the output. However, in reality that is not the case. For example, the inductor 440 provides at least two sources of power loss: resistance loss and coil loss. Resistance loss refers to the fact that the wire material (e.g., copper) has an internal resistance that converts electrical energy in the inductor 440 to heat energy. Coil loss refers to loss due to a nonuniformity of the magnetic field because of the finite number of windings in the inductor 440.

Note that there is a tradeoff: resistance loss may be minimized or decreased by using fewer coils, but that in turn would increase coil loss. Along these lines, one may minimize or reduce power loss from the inductor by choosing a desirable number of coils. In this way, conversion efficiencies of over 95% have been achieved (i.e., power loss of less than 5%), in some implementations the efficiencies were over 97% (i.e., power loss of less than 3%) and in some further implementations the efficiencies were over 98% (i.e., power loss of less than 2%).

Figure 5:
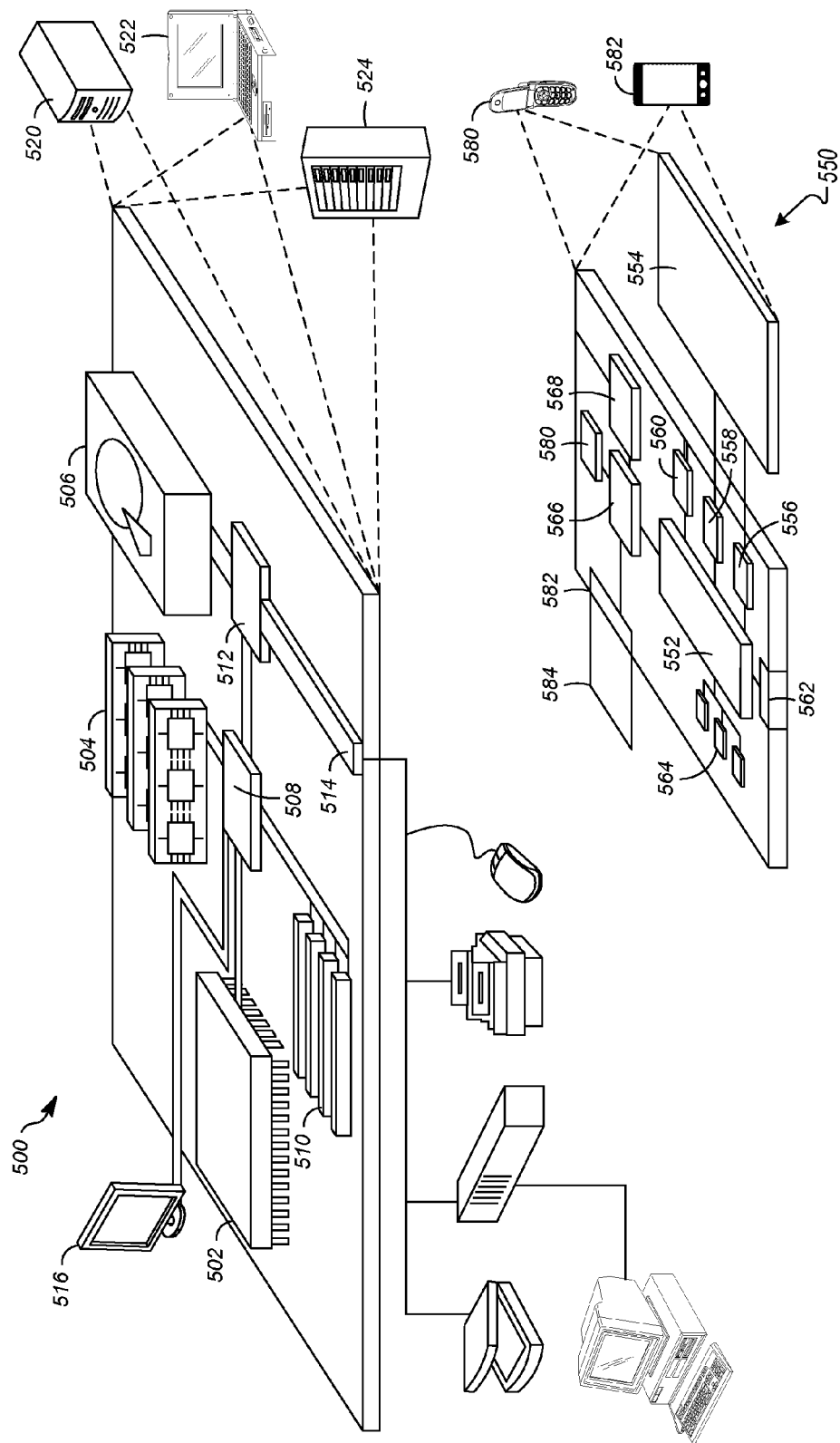
FIG. 5 illustrates an example of a computer device and a mobile computer device that can be used with circuits described here.

FIG. 5 illustrates an example of a generic computer device 500 and a generic mobile computer device 550, which may be used with the techniques described here. The circuits (e.g., circuit 100, circuit 300) described herein can be used in connection with any of the computer devices (and/or associated adapters) described in connection with FIG. 5.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 404 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A circuit, comprising:
   a transformer electrically coupled between a primary side of the circuit and a secondary side of the circuit,
   the primary side of the circuit including:
      an input terminal configured to receive an input alternating current (AC) voltage signal;
      a bridge rectifier configured to (i) receive the input AC voltage signal from the input terminal and (ii) output a rectified AC voltage signal from the input AC voltage signal; and
      a flyback controller configured to produce, across the transformer, a time-varying fly voltage signal on the secondary side of the circuit from the rectified AC voltage signal on the primary side of the circuit, and
   the secondary side of the circuit including a buck converter configured to generate a direct current (DC) output voltage based on the time-varying fly voltage signal,
   wherein the DC output voltage is applied across a load for a universal serial bus (USB) type C adapter, the DC output voltage being less than a minimum value of the time-varying fly voltage signal.

2. A circuit as in claim 1, wherein the primary side of the circuit further includes a switch having a state, the state being one of an ON state and an OFF state,
   wherein the flyback controller configured to produce the time-varying fly voltage signal on the secondary side of the circuit is further configured to toggle the switch between the ON state and the OFF state, and
   wherein the switch is configured to:
      in the ON state, produce energy in the transformer from current flowing through a primary winding of the transformer in the primary side of the circuit, the current flowing through the primary winding being generated by the rectified AC voltage signal; and
      in the OFF state, transfer the energy in the transformer to a secondary winding of the transformer in the secondary side of the circuit to produce the time-varying fly voltage signal.

3. A circuit as in claim 2, further comprising a feedback circuit configured to produce a feedback signal based on the time-varying fly voltage signal, and
   wherein the flyback controller configured to toggle the switch between the ON state and the OFF state is further configured to:
      receive the feedback signal produced by the feedback circuit; and
      set the switch to be in one of the ON state and the OFF state according to the feedback signal.

4. The circuit as in claim 2, wherein the flyback controller is configured to toggle the switch between the ON state and the OFF state at a duty cycle specified according to a ratio of the DC output voltage to the minimum value of the time-varying fly voltage signal.

5. The circuit as in claim 1, wherein the flyback controller configured to produce the time-varying fly voltage signal on the secondary side of the circuit is further configured to generate, as the time-varying fly voltage signal, a voltage signal including:
   a maximum voltage; and
   a minimum voltage less than the maximum voltage and greater than the DC output voltage.

6. The circuit as in claim 5, wherein the voltage signal further includes a frequency equal to a frequency of the rectified AC voltage signal.

7. The circuit of claim 1, wherein the secondary side of the circuit further includes a fly capacitor configured to produce a regulated voltage signal from the fly voltage signal, the regulated voltage signal having a smaller peak-to-peak variation over time than the fly voltage signal, and
   wherein the buck converter configured to generate the DC output voltage based on the time-varying fly voltage signal is further configured to:
      receive the regulated voltage signal from the fly capacitor; and
      produce the DC output voltage from the regulated voltage signal.

8. The circuit as in claim 7, wherein the primary side of the circuit further includes a bulk capacitor between the bridge rectifier and the transformer; and
   wherein the fly capacitor has a capacitance greater than 30% of the capacitance of the bulk capacitor.

9. The circuit as in claim 1, wherein the primary side of the circuit excludes a bulk capacitor between the bridge rectifier and the transformer.

10. The circuit as in claim 1, wherein the power provided by the DC output voltage is greater than 97% of the average power provided by the fly voltage signal over a cycle.

11. The circuit as in claim 1, wherein the circuit operates at a power of 75 Watts or greater.

12. A method, comprising:
   receiving an alternating current (AC) voltage signal at an input terminal of a first side of a circuit;
   rectifying the AC voltage signal to produce a rectified AC voltage signal at the first side of the circuit;
   producing a time-varying fly voltage signal on a second side of the circuit from the rectified AC voltage signal on the first side of the circuit, the first side of the circuit being electrically connected to the second side of the circuit by a transformer; and
   generating a direct current (DC) output voltage at an output terminal of the second side of the circuit based on the time-varying fly voltage signal,
   wherein the DC output voltage is applied across a load for a universal serial bus (USB) type C adapter, the DC output voltage being less than a minimum value of the time-varying fly voltage signal.

13. The method as in claim 12, wherein the first side of the circuit further includes a flyback controller, and
   wherein producing the time-varying fly voltage signal includes:
      receiving, at the flyback controller, a feedback signal from the second side of the circuit; and
      generating, at the transformer, the time-varying fly voltage signal according to the feedback signal.

14. The method as in claim 13, wherein the first side of the circuit further includes a switch having a state, the state being one of an ON state and an OFF state, wherein generating the time-varying fly voltage signal according to the feedback signal includes:

setting the state of the switch to be one of the ON state and the OFF state based on the feedback signal;

wherein, at a first time when the state of the switch is the ON state, producing energy in the transformer from current flowing through a primary winding of the transformer in the primary side of the circuit, the current flowing through the primary winding being generated by the rectified AC voltage signal; and wherein, at a second time when the state of the switch is the OFF state, transferring the energy in the transformer to a secondary winding of the transformer in the second side of the circuit to produce the time-varying fly voltage signal.

15. The method as in claim 12, wherein producing the time-varying fly voltage signal on the second side of the circuit from the rectified AC voltage signal includes generating, as the time-varying fly voltage signal, a voltage signal including:

a maximum voltage; and a minimum voltage less than the maximum voltage and greater than the DC output voltage.

16. The method as in claim 15, wherein the voltage signal further includes a frequency equal to a frequency of the rectified AC voltage signal.

17. The method as in claim 12, wherein the second side of the circuit further includes a fly capacitor configured to produce a regulated voltage signal from the fly voltage signal, the regulated voltage signal having a smaller peak-to-peak variation over time than the fly voltage signal, and wherein generating the DC output voltage based on the time-varying fly voltage signal includes:

receiving the regulated voltage signal from the fly capacitor; and producing the DC output voltage from the regulated voltage signal.

18. The method as in claim 17, wherein the first side of the circuit further includes a bulk capacitor between a bridge rectifier and the transformer, the bridge rectifier being configured to rectify the AC voltage signal; and wherein the fly capacitor has a capacitance greater than 30% of the capacitance of the bulk capacitor.

19. The method as in claim 12, further comprising excluding a bulk capacitor between the bridge rectifier and the transformer on the first side of the circuit.

20. The method as in claim 12, wherein the power provided by the DC output voltage is greater than 97% of the average power provided by the fly voltage signal over a cycle.

* * * * *